United States Patent [19]

Nozaka et al.

[11] Patent Number: 4,887,680
[45] Date of Patent: Dec. 19, 1989

[54] DEVICE FOR CONNECTING WORK MACHINE TO TRACTOR

[75] Inventors: Kenkichi Nozaka; Yoshihiro Kawahara; Takashi Fukutaka; Fumiharu Horie, all of Osaka, Japan

[73] Assignee: Kubota Ltd., Osaka, Japan

[21] Appl. No.: 239,758

[22] Filed: Sep. 1, 1988

[30] Foreign Application Priority Data

Sep. 3, 1987 [JP] Japan .................................. 62-221721
Sep. 14, 1987 [JP] Japan .................................. 62-230844

[51] Int. Cl.$^4$ ............................................. B60K 25/00
[52] U.S. Cl. ...................................... 180/53.3; 172/47; 172/272; 180/14.4; 280/415.1; 403/359; 464/113; 464/158
[58] Field of Search ................. 180/14.1, 14.4, 53.1, 180/53.3; 280/415 A, 456 A, 461 A, 477, 478 R, 479 R, 479 A, 508; 403/359; 172/328, 445, 448, 47, 275, 272; 464/113

[56] References Cited

U.S. PATENT DOCUMENTS

| | | | |
|---|---|---|---|
| 3,074,501 | 1/1963 | Lane et al. | 180/14.1 |
| 3,283,840 | 11/1966 | Lane | 180/53.1 X |
| 3,299,979 | 1/1967 | Restall | 180/14.1 |
| 3,512,804 | 12/1967 | Siegert | 280/509 |
| 3,807,769 | 4/1974 | Thompson et al. | 172/272 |
| 3,871,463 | 3/1975 | Geisthoff | 180/14.4 |
| 4,023,638 | 5/1977 | Holmes et al. | 180/14.4 |
| 4,071,105 | 1/1978 | van Allworden | 180/14.4 |
| 4,090,725 | 5/1978 | Perin | 172/272 |
| 4,176,727 | 12/1979 | Perin | 180/53.3 |
| 4,203,238 | 5/1980 | Bangert et al. | 37/118 R |
| 4,512,413 | 4/1985 | Hirata et al. | 172/74 |
| 4,799,563 | 1/1989 | Yukino | 180/14.4 |

FOREIGN PATENT DOCUMENTS

| | | |
|---|---|---|
| 2621162 | 5/1976 | Fed. Rep. of Germany. |
| 3612322 | 11/1986 | Fed. Rep. of Germany. |
| 55123207 | 9/1980 | Japan. |
| 68216605 | 12/1983 | Japan. |
| 60-259104 | 12/1985 | Japan. |
| 61-11 | 1/1986 | Japan. |
| 56466 | 6/1944 | Netherlands .................... 180/14.1 |

Primary Examiner—Mitchell J. Hill
Attorney, Agent, or Firm—Birch, Stewart, Kolasch & Birch

[57] ABSTRACT

A device for automatically connecting a work machine to a tractor includes a connector for interconnecting the rear ends of top link and lower links of a three-point link assembly pivoted to the body of the tractor. The connector has an upper engaging portion and lower engaging portions automatically engageable with an upper connecting portion and lower connecting portions of the work machine, respectively. The connector is further provided with an assembly for automatically coupling the input shaft of the work machine to a transmission shaft connected to the PTO shaft of the tractor. The coupling assembly includes a coiled spring supporting the rear end of the transmission shaft freely movably and axially movably for accommodating misalignment of the input shaft relative to the transmission shaft when the two shafts are to be coupled together.

11 Claims, 7 Drawing Sheets

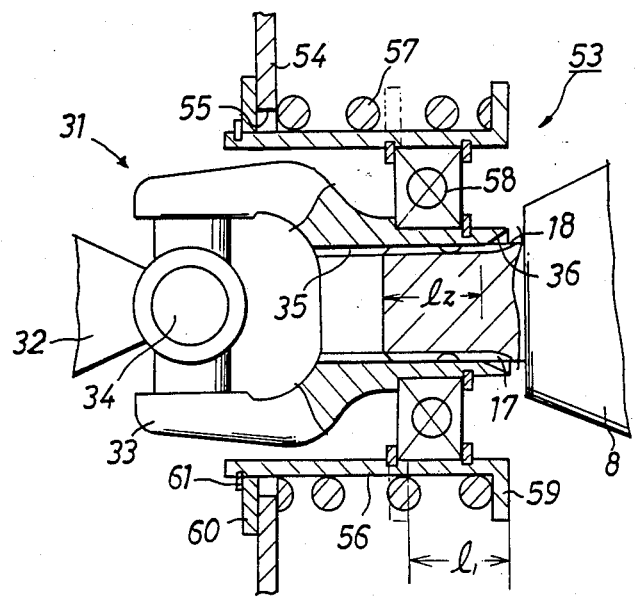
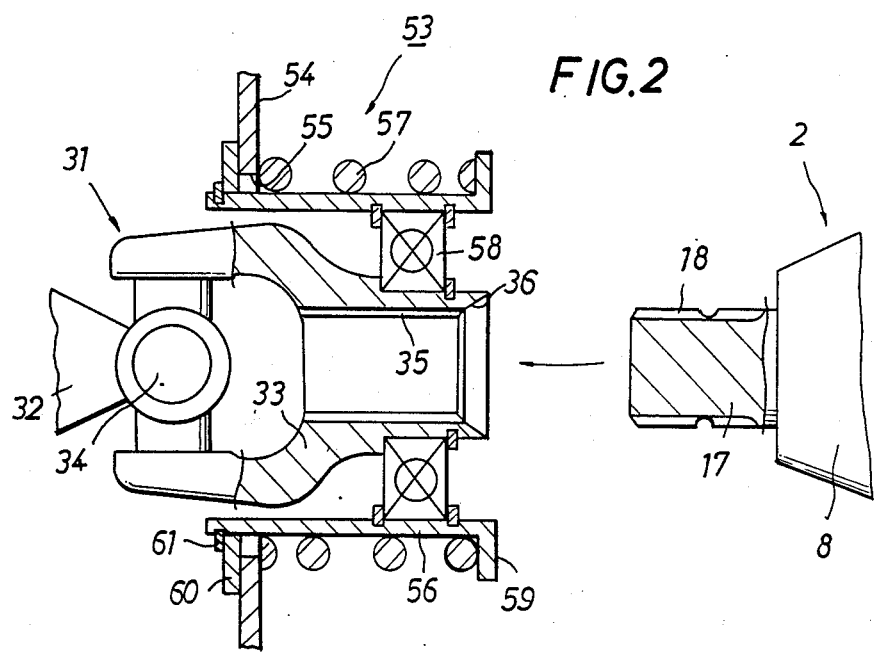
FIG.2

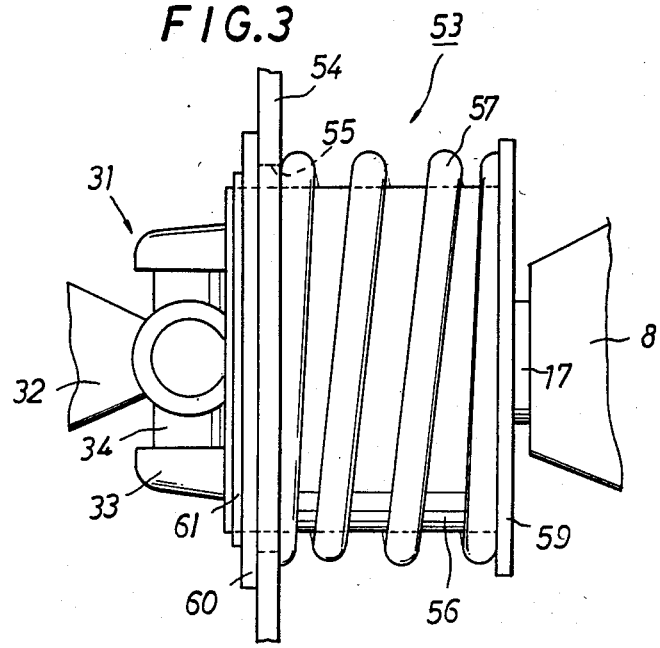
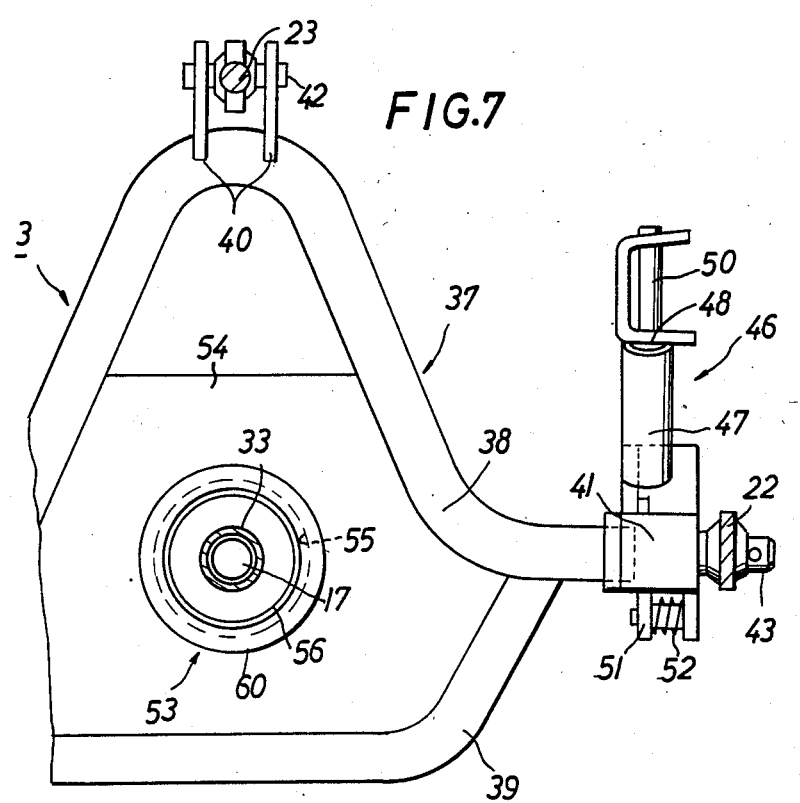

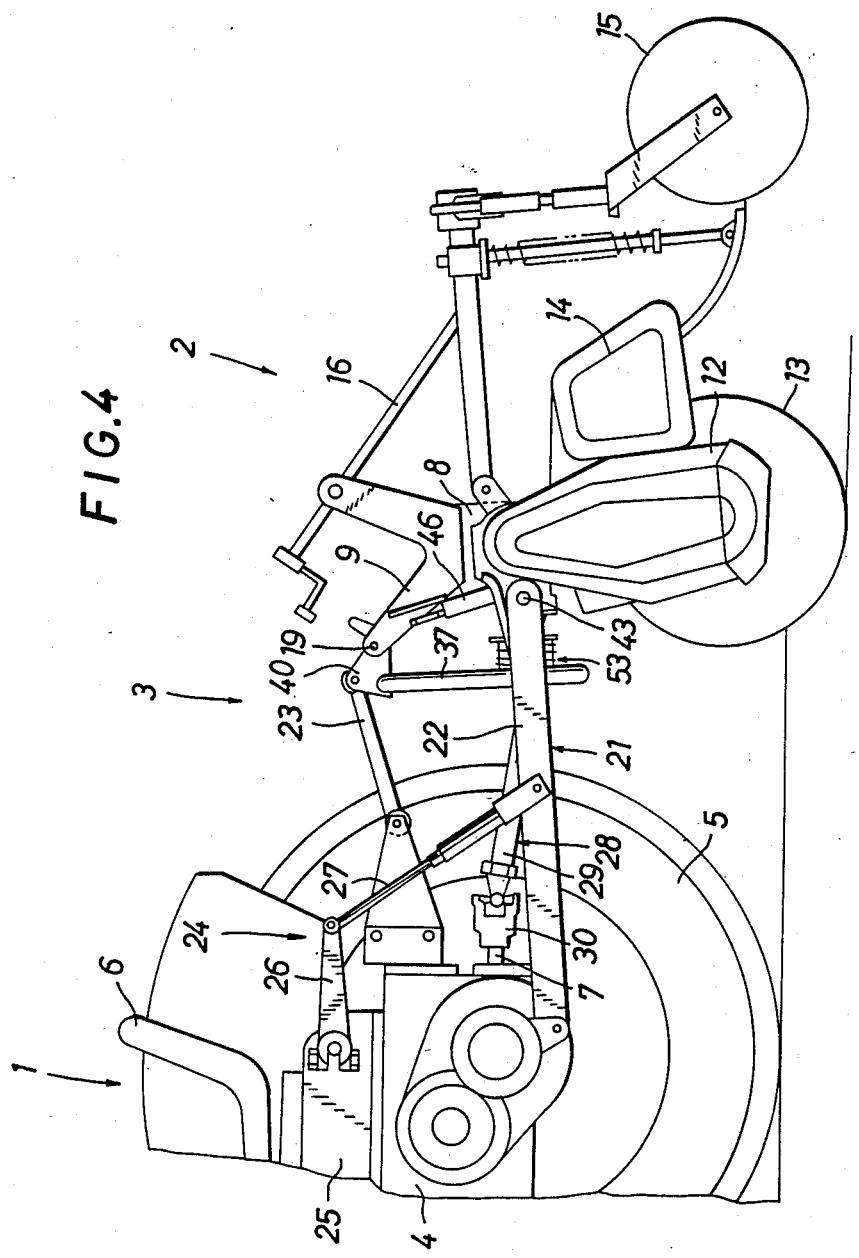

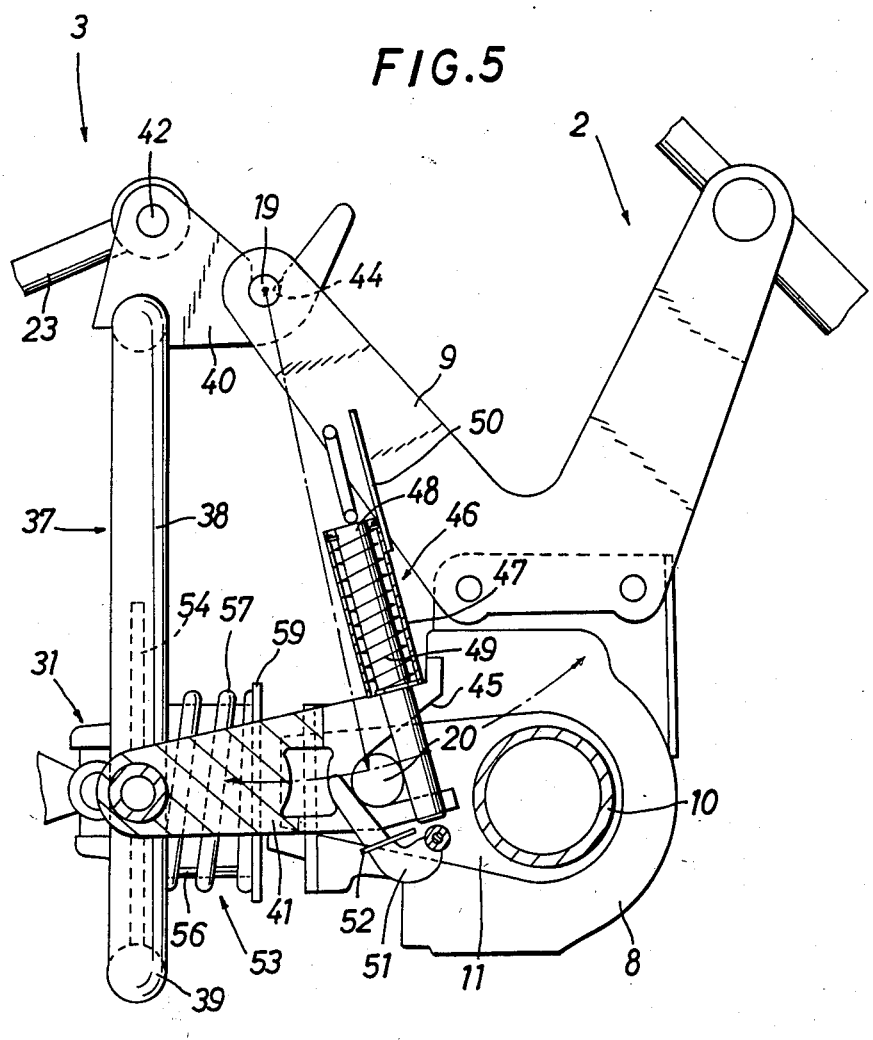

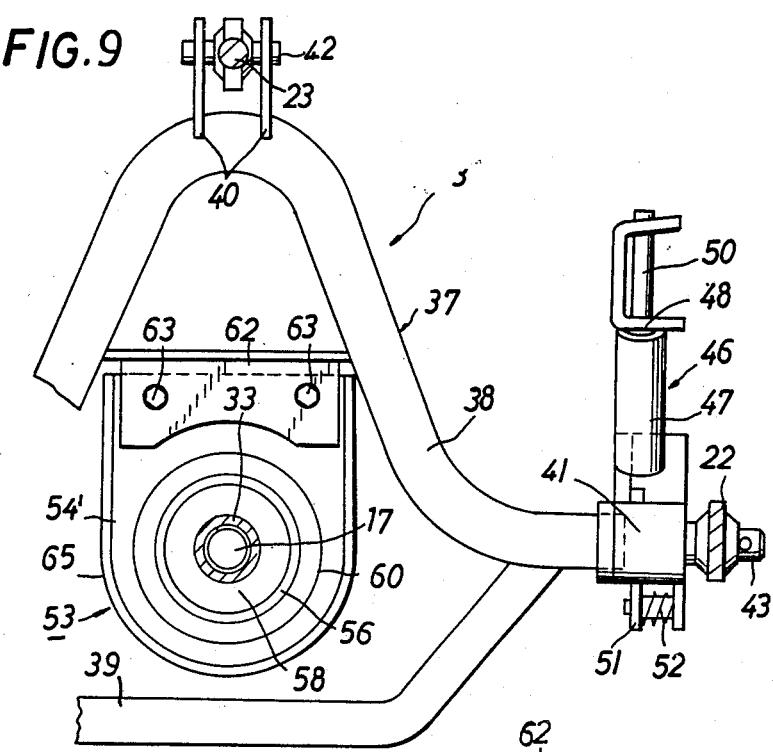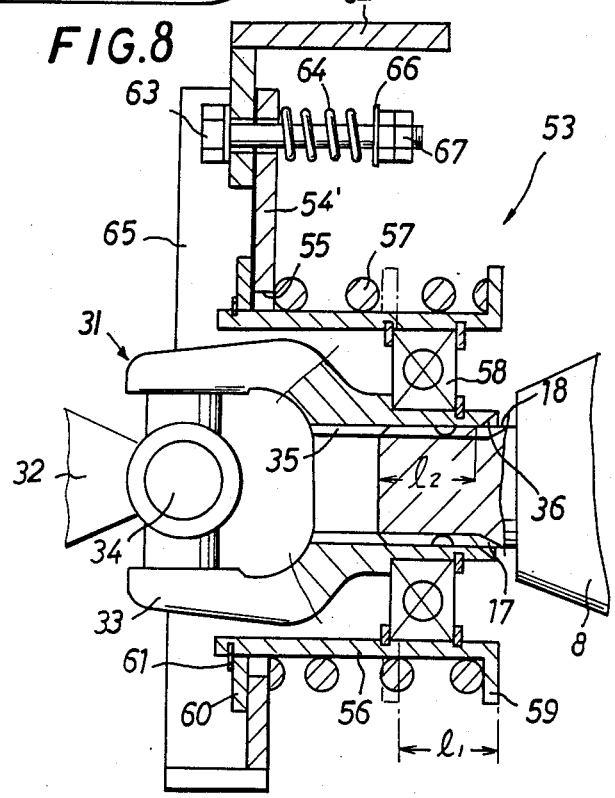

DEVICE FOR CONNECTING WORK MACHINE TO TRACTOR

FIELD OF THE INVENTION AND RELATED ART STATEMENT

The present invention relates to a connecting device for automatically removably interconnecting the power systems of a tractor and a work machine simultaneously when the bodies of the tractor and the machine are automatically removably interconnected.

Conventional devices for automatically connecting a work machine to a tractor comprise a three-point link assembly provided on the tractor, and a connector attached to the three-point link assembly. The connector has an upper engaging portion at its upper portion and a pair of opposed lower engaging portions at its lower portion (see Unexamined Japanese Patent Publication SHO 60-259104).

The conventional connecting device is so adapted that the upper and lower engaging portions are automatically joined to the body of the work machine when the work machine is brought close to the tractor. However, the PTO shaft of the tractor must be manually connected to the input shaft of the work machine with a transmission shaft.

A device is already known for automatically connecting the input shaft of the work machine to the PTO shaft of the tractor simultaneously when the machine is connected to the tractor (see Examined Japanese Utility Model Publication SHO 61-11).

The known connecting device comprises a tubular case rotatably supporting the outer end of a transmission shaft attached to the PTO shaft, and stays for supporting the tubular case on the above-mentioned connector. The end of the transmission shaft is connected to the machine input shaft detachably by a claw clutch.

The tubular case of the conventional connecting device is immovably supported by the stays on the connector, so that it is difficult to align the transmission shaft with the input shaft. The claw clutch connecting the transmission shaft to the input shaft is unable to transmit great power. Because the claw clutch is used, the connection has a small allowance and is therefore liable to separate.

While the transmission shaft is usually splined to the input shaft, the above arrangement has the problem of additionally providing the claw clutch in place of the spline joint.

On the other hand, the spline joint between the transmission shaft and the input shaft has a great length and accordingly encounters difficulties in automatically connecting the two shafts together.

SUMMARY OF THE INVENTION

An object of the present invention is to provide an automatic connecting device adapted to spline the input shaft of a work machine to the transmission shaft of a tractor when the machine is automatically attached to the tractor.

Another object of the invention is to provide a connecting device adapted to readily align the input shaft with the transmission shaft by accommodating the misalignment therebetween when the input shaft is to be splined to the transmission shaft.

The connecting device of the invention is so adapted that the body of a work machine and a splined input shaft thereof can be automatically connected to a tractor.

The present invention is characterized in that in automatically coupling the input shaft of a work machine to the transmission shaft of a tractor, the input shaft is smoothly splined to the transmission shaft by effectively accommodating the misalignment between the input shaft and the transmission shaft end.

To absorb or accommodate the misalignment, a tubular case rotatably supporting the end of the transmission shaft is supported by resilient support means on a connector and is free to move diametrically and axially of the case.

Even if the input shaft strikes against an out of alignment transmission shaft out of alignment therewith when being splined thereto, the tubular case is allows movement diametrically or axially thereof or otherwise by the resilient support means to correct the misalignment, whereby the two shafts are smoothly coupled together.

Further scope of applicability to the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 is a view partly in section of a transmission shaft and an input shaft as coupled thereto by a connecting device of the present invention;

FIG. 2 is a view partly in section showing the transmission shaft and the input shaft before coupling;

FIG. 3 is a side elevation showing the device in the same state as in FIG. 1;

FIG. 4 is a side elevation showing a tractor and a work machine as connected thereto by the device;

FIG. 5 is a fragmentary enlarged view partly in section of the device with the shafts coupled together;

FIG. 7 is a front view showing the device;

FIG. 8 is a view partly in section of a transmission shaft and an input shaft as coupled thereto by another connecting device of the invention;

FIG. 9 is a front view of the device;

DESCRIPTION OF THE PREFERRED EMBODIMENTS

Figure 6:
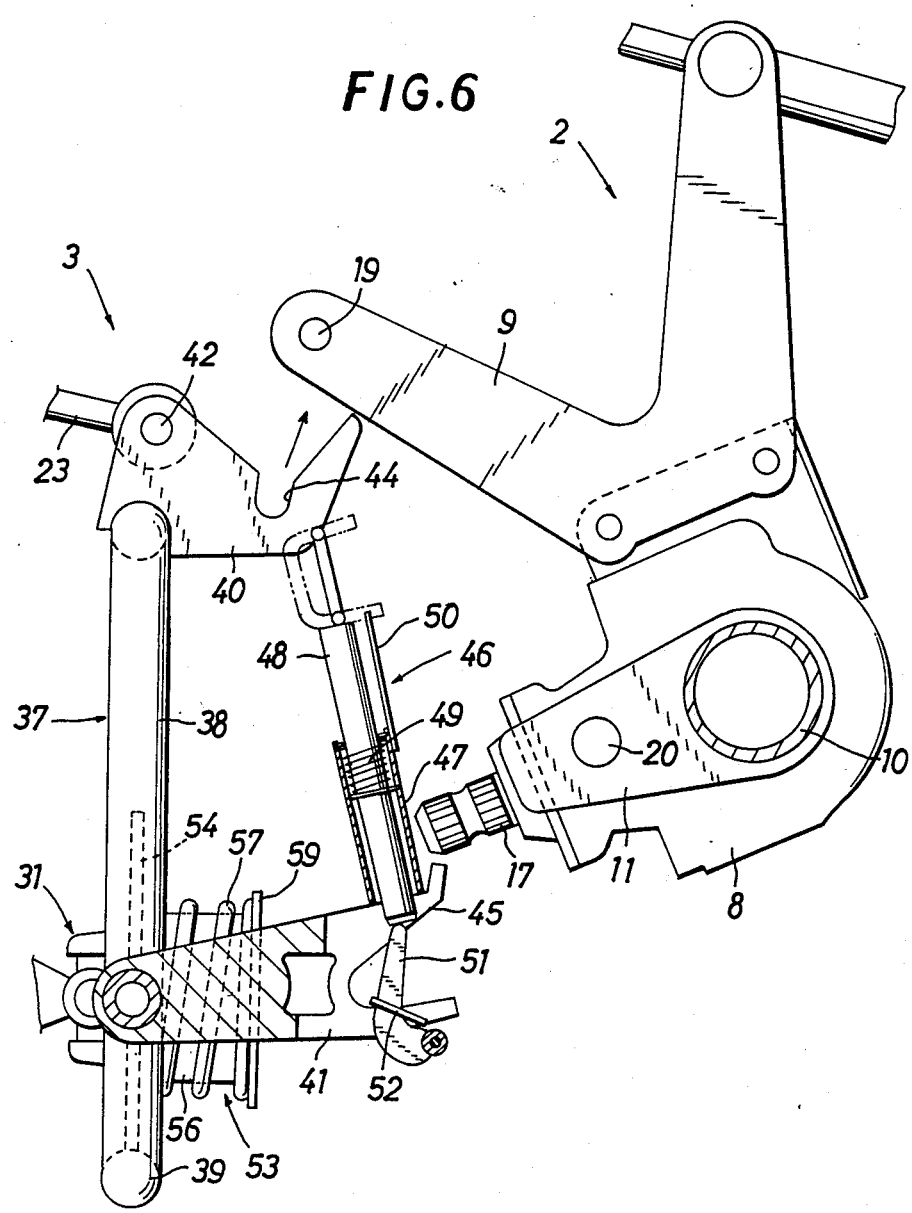
FIG. 6 is a fragmentary enlarged view partly in section and showing the device before coupling.

Embodiments of the invention will be described below with reference to the drawings.

FIG. 4 shows a tractor 1, a work machine 2 and a connecting device 3.

The tractor 1 has a body 4, rear wheels 5, a seat 6, a PTO shaft 7, etc. The PTO shaft 7 is projected from the rear end of the tractor body 4 and drivingly rotated by an engine (not shown).

The work machine 2 is a side-drive rotary cultivator. The work machine 2 has an input case 8 positioned in the middle (widthwise of the machine) of its front upper portion, a top mast 9 projecting obliquely forwardly upward from the input case 8, a pair of support arms 10 projecting from the respective lateral sides of the case 8, a pair of brackets 11 each projecting forward from an intermediate portion of the support arm 10 and, a transmission case 12 and a side plate (not shown) extending downward from the outer ends of the respective support arms 10. A tiller 13 is provided with a tiller shaft laterally extending between and supported by the transmission case 12 and the side plate and tines attached to the tiller shaft, a tiller cover 14 covering the tiller 13, a pair of opposed gauge wheels 15 mounted on a frame extending rearward from the support arms 10, and a cultivation depth adjusting means 16 for moving the gauge wheels 15 upward or downward, etc. (See also FIG. 6.)

With reference to FIG. 6, the input case 8 of the work machine 2 has an input shaft 17 projecting forward from its front end. The input shaft 17 is externally splined as at 18. The input shaft 17, when rotated, drivingly rotates the tiller 13.

The top mast 9 of the work machine 2 has an upper connecting portion 19 at its upper part. The portion 19 is in the form of a rod having a lateral horizontal axis.

The opposed brackets 11 of the work machine 2 each have a lower connecting portion 20 at its front part. The lower connecting portion 20 comprises a rod having a lateral horizontal axis.

The connecting device 3 embodying the invention serves to removably automatically connect the work machine 2 to the tractor 1.

The connecting device 3 has a three-point link assembly 21, which comprises a pair of opposed lower links 22, 22 pivoted to the respective sides of the tractor body 4 at its lower portion movably upward and downward and extending rearward therefrom, and a top link 23 extending rearward and pivoted to the lateral midportion of the tractor body 4 at its rear upper portion movably upward and downward.

The connecting device 3 has lift means 24 for pivotally moving the three-point link assembly 21 upward and downward. The lift means 24 comprises a hydraulic unit 25 mounted on the top of the tractor body 4 at its rear portion, a pair of opposed lift arms 26, 26 extending rearward from the respective lateral sides of the unit 25 and pivotally movable upward and downward, and lift rods 27 connecting the lift arms 26 to the lower links 22 of the link assembly 21.

The connecting device 3 has a transmission shaft 28 for operatively connecting the PTO shaft 7 of the tractor 1 to the input shaft 17 of the work machine 2. The transmission shaft 28 comprises a stretchable shaft member 29, and front and rear universal joints 30, 31 provided at the respective ends of the shaft member 29. The front universal joint 30 is joined to the PTO shaft 7. The rear universal joint 31 comprises a front yoke 32 fixed to the shaft member 29, and a rear yoke or female spine coupling 33 attached to the front yoke 32 by a spider 34 (see FIG. 2). The rear yoke 33 is formed around its axis with an internally splined portion 35 fittable to the externally splined portion 18 of the input shaft 17 of the work machine 2. The outer end of the internally splined portion 35 has a chamfer 36.

The connecting device 3 further has a connector 37 connecting the rear ends of the lower links 22, 22 to the rear end of th top link 23. As seen in FIG. 7, the connector 37 comprises a connector member 38 formed by bending a pipe to an inverted V-shape as seen from the front, a bridge member 39 made of a pipe, interconnecting opposite side lower portions of the connector member 38 and protruding downward, a bracket 40 projecting upward from the top midportion of the connector member 38, a pair of opposite support members 41, 41 projecting rearward from opposite lower ends of the connector member 38, etc. The bracket 40 carries an attaching pin 42 having a lateral horizontal axis and removably supporting thereon the rear end of the top link 23. Each support member 41 is provided with a connecting pin 43 having a lateral horizontal axis and removably supporting thereon the rear end of the lower link 22.

As shown in FIG. 6, the connecting device 3 further has an upper engaging portion 44 releasably engageable with the upper connecting portion of the work machine 2. The bracket 40 has an upwardly open cutout formed in the upper edge of its rear portion to provide the upper engaging portion 44. This engaging portion 44 is engageable with the upper connecting portion 19 from below.

The connecting device 3 further has lower engaging portions 45 releasably engageable with the respective lower connecting portions 20 of the work machine 2. Each lower engaging portion 45 is provided by a rearwardly open cutout formed in the rear end of the support member 41. With reference to FIG. 5, the lower engaging portions 45 come into engagement with the lower connecting portions 20 when the work machine 2 pivotally moves forward about the upper connecting portion 19, with the upper engaging portion 44 in engagement with the upper connecting portion 19.

As seen in FIGS. 5 and 6, each of the support members 41 is provided with an assembly 46 for restraining the lower engaging portion 45 from moving out of engagement with the lower connecting portion 20. The restraining assembly 46 comprises a tube 47 extending upward from the top of the support member 41, a retaining pin 48 inserted through the tube 47 upwardly and downwardly movably and having a lower portion projecting downward from the lower end of the tube 47 and positionable across the lower engaging portion 45, a spring 49 for biasing the retaining pin 48 downward, a lock plate 50 secured to the tube 47 and extending upward therefrom for engaging an upper portion of the pin 48 as shifted upward to a position in which the pin lower end is away from the lower engaging portion 45, a restricting member 51 pivoted to the support member 41 and positionable in the lower engaging portion 45 to engage the lower end of the retaining pin 48 when the pin 48 is shifted upward as above, and a spring 52 for biasing the restricting member 51.

The connecting device 3 further has an assembly 53 for removably coupling the input shaft 17 of the work machine 2 to the rear yoke 33 of the transmission shaft 28. With reference to FIGS. 1 to 3 and FIG. 7, the coupling assembly 53 comprises a holder 54 in the form of a flat plate centrally formed with an aperture 55, a tubular case 56 loosely inserted through the aperture 55 of the holder 54 with a clearance formed around the case, and resilient support means 57 for resiliently supporting the tubular case 56 on the holder 54. The holder 54 is secured to the connector member 38 and the bridge member 39 of the connector 37. The rear yoke 33 of the transmission shaft is rotatably supported on the case 56 inside thereof with a bearing 58 and is axially immovable relative to the case. The tubular case 56 has a rear portion projecting rearward from the aperture 55 and a spring support 59 projecting radially outward from its rear end. The front portion of the tubular case 56 is projected forward from the aperture 55 and has a washer 60 attached to its front end. This washer 60 is prevented from slipping off by a retaining ring 61. The resilient support means 57 is a coiled compression spring fitting around the tubular case 6 and having a front end face in bearing contact with the holder 54 and a rear end face in bearing contact with the spring support 59. The washer 60 is in bearing contact with the front surface of the holder 54. The tubular case 56 is biased rearward by the spring 57 and supported by the holder 54 so as to be free to mo diametrically and axially of the case. By virtue of the weight of the transmission shaft 28 and the resilient force of the spring. 57 which are in balance with each other, the tubular case 56 is supported with its axis positioned approximately horizontally in the front-to-rear direction. The maximum distance $l_1$ of forward movement of the tubular case 56 in its axial direction is not smaller than the length $l_2$ engagement between the externally splined portion 18 of the work machine input shaft 17 and the internally splined portion 35 of the rear yoke 33, that is, $l_1 \geq l_2$.

FIGS. 8 and 9 show another type of coupling assembly 53. With this assembly 53, a holder 54' is movably attached at its upper portion to a bracket 62 with two bolts 63 and coiled springs 64. The bracket 62 is L-shaped in section and secured to the connector member 38 of the connector 37. The holder 54' is formed with a reinforcing rib 65 along its outer periphery except at its upper portion. Each spring 64 is fitted around the bolt 63 and held compressed by a spring support 66 and a double nut 67 provided at the rear end of the bolt 63. Owing to the elastic deformation of the coiled springs 64, the holder 54' is movable forward and rearward and is also slightly movable in other directions. With the exception of the above feature, the coupling assembly 53 has the same construction as the one shown in FIG. 2.

Figure 10:
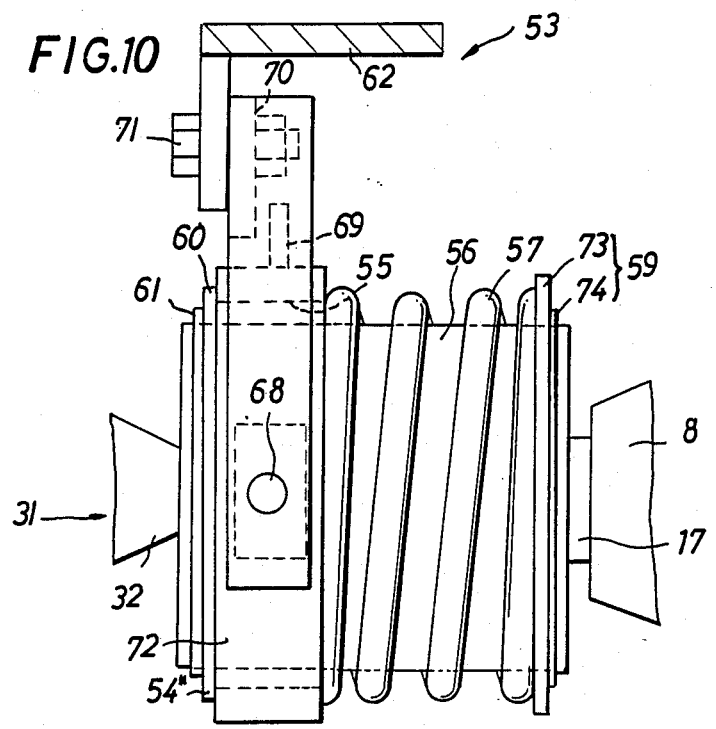
FIG. 10 is a side elevation showing a coupling assembly included in another connecting device of the invention.
Figure 11:
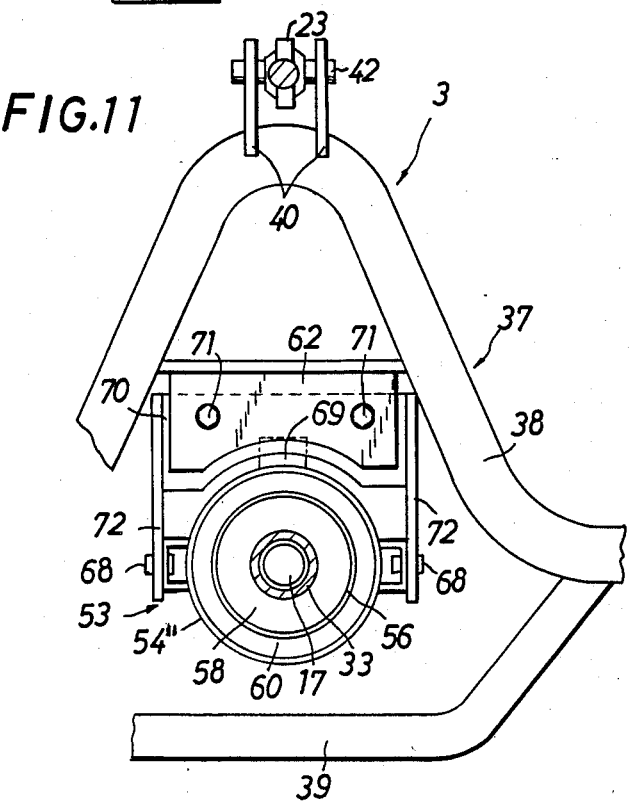
FIG. 11 is a front view of the device.

FIGS. 10 and 11 show another type of coupling assembly 53. In this case, the holder 54',is in the form of a hollow cylinder and has on its lateral sides projecting pivots 68 having a lateral horizontal axis. The holder 54' has a stopper 69 projecting upward from its top. Secured to the connector member 38 of the connector 37 is a bracket 62, to which a mount plate 70 is fastened with bolts 71. Support arms 72 are secured to, and extend downward from, the respective sides of the mount plate 70. The pivots 68 on the holder 54' are supported by the support arms 72. The stopper 69 on the holder 54' is adapted to contact the mount plate 70 to prevent excessive pivotal movement of the holder 54'. A tubular case 56 inserted through an aperture 55 of the holder 54 has a spring support 59 which comprises a washer 73 and a retaining ring 74. With the exception of the above feature, the coupling assembly 53 has the same construction as the one shown in FIG. 2.

The connecting device 3 functions as follows. When the work machine 2 is to be connected to the tractor 1, the retaining pin 48 of each restraining assembly 46 on the connector 37 is held in its raised position by the restricting member 51. The work machine 2 on the ground is in a slightly forwardly inclined position as seen in FIG. 6.

In this state, the tractor 1 is driven rearward toward the work machine 2 to position the upper and lower engaging portions 44, 45 of the connector 37 under, and slightly to the front of, the upper and lower connecting portions 19, 20 of the machine 2, respectively, as seen in FIG. 6.

Next, the three-point link assembly 21 is gradually raised by the hydraulic unit 25 of the lift means 24 to cause the upper connecting portion 19 to engage in the upper engaging portion 44 of the connector 37. In this state, the lower engaging portions 45 are positioned in front of the respective lower connecting portions 20.

The three-point link assembly 21 is further raised, whereby the work machine 2 is moved about the upper connecting portion 19 forward toward the tractor 1 while being lifted since the upper connecting portion 19 is engaged in the upper engaging portion 44.

Consequently, each lower connecting portion 20, while being engaged in the lower engaging portion 45 from behind, pivotally moves the restricting member 51 forward through the lower engaging portion 45.

The forward movement of the restricting member 51 releases the retaining pin 48, allowing the pin 48 to advance into the lower engaging portion 45 to restrain the lower connecting portion 20 from disengagement from the lower engaging portion 45 as shown in FIG. 5.

The above movement of the work machine 2 about the upper connecting portion 19 toward the tractor 1, engaging the lower connecting portions 20 in the respective lower engaging portions 45 of the connector 37, permits the input shaft 17 of the machine 2 to advance into the rear yoke 33 while being guided by the chamfer 36 of the rear yoke 33, whereby the externally splined portion 18 of the input shaft 17 is brought into meshing engagement with the internally splined portion 35 of the rear yoke 33.

In this case, the input shaft 17 does not advance straight into the tubular case 56 axially thereof from behind but moves on a circular locus centered about the upper connecting portion 19 to advance into the rear yoke 33. Accordingly, even when the input shaft 17 and the rear yoke 33 are properly positioned before coupling, the axes of these two members will intersect each other when the input shaft 17 advances into the rear yoke 33.

However, the tubular case 56 is loosely inserted through the holder 54' attached to the connector 37 and is held by the coiled spring 57 freely movably diametrically and axially thereof. Consequently, when the input shaft 17 is to be coupled to the rear yoke 33, the coiled spring 57 is stretched, compressed or otherwise deformed, allowing the case 56, as well as the shaft 17, to translate upward or downward or to move diametrically or axially thereof, whereby the misalignment of the input shaft 17 relative to the rear yoke 33 is corrected, permitting the shaft 17 to smoothly come into meshing engagement therewith.

Furthermore, when the input shaft 17 is not properly positioned relative to the rear yoke 33 before coupling and is therefore out of alignment therewith when to be coupled thereto, the misalignment between the shaft 17 and the yoke 33 can be corrected by the diametrical, axial or other movement of the tubular case 56, whereby the two members can be coupled together smoothly and properly.

When the input shaft 17 is to be joined to the rear yoke 33, it is likely that the externally splined portion 18 of the input shaft 17 does not match the internally splined portion 35 of the rear yoke 33 circumferentially thereof.

The tubular case 56 is axially movably supported by the holder 54 attached to the connector 37 and is axially forwardly movable up to the maximum distance $l_1$ which is not smaller than the axial length $l_2$ of engagement between the shaft splined portion 18 with the yoke splined portion 35, with the result that in the above case, the tubular case 56 is pushed forward by the input shaft 17 while compressing the coiled spring 57 and contracting the transmission shaft member 29 to permit the lower connecting portions 20 of the work machine 2 to engage in the respective lower engaging portions 45 of the connector 37 free of any trouble.

After the engagement, the PTO shaft is slightly driven to rotate the rear yoke 33 through the transmission shaft 28, etc. and thereby position the internally splined portion 35 of the yoke 33 in match with the externally splined portion 18 of the input shaft 17 circumferentially thereof.

When the two portions are thus properly positioned for meshing, the coiled spring 57 acts to move the tubular case 56 rearward while stretching the shaft member 29, causing the splined yoke portion 35 to mesh with the splined shaft portion 18.

In this way, the work machine 2 is completely connected to the tractor 1.

The work machine 2 is separated from the tractor 1 by a reverse procedure to the above. First, the retaining pin 48 of the restraining assembly 46 is pulled up and engaged with the lock plate 50 as indicated in phantom line in FIG. 6 to hold the pin 48 retracted from the lower engaging portion 45.

In this state, the hydraulic unit 25 is operated to cause the three-point link assembly 21 and the connector 37 to lower the work machine 2 to place the tiller 13 on the ground.

When the three-point link assembly 21 and the connector 37 are further lowered, the work machine 2 is pivotally moved rearward about the upper connecting portion 19 to a forwardly inclined position, allowing the lower connecting portions 20 of the work machine 2 to disengage from the lower engaging portions 45 of the connector 37 and permitting the input shaft 17 to move out of the rear yoke 33 while translating the tubular case 56 upward or downward and moving the case diametrically thereof, whereby the input shaft 17 is removed from the rear yoke 33.

The connector 37 is further lowered, whereby the upper connecting portion 19 of the machine 2 is moved out of engagement with the upper engaging portion 44 of the connector 37.

Thus, the work machine 2 is completely separated from the tractor 1.

Although the input shaft and the transmission shaft are splined for meshing engagement according to the embodiments described, other structures equivalent to the spline joint can alternatively be used.

The universal joints used in the embodiments for coupling the PTO shaft to the input shaft may be replaced by other joints equivalent thereto.

Although a rotary cultivator is used as the work machine in the foregoing description, other work machines are usable.

The present invention is applicable also to a device for connecting a work machine to the front of the tractor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A device for removably connecting a tractor having a PTO shaft with a work machine having a power input shaft with a male spline-ended portion, the work machine also having means for connection at an upper connecting position and two lower positions thereof, the connecting device comprising:
    (a) three-point link assembly means having a pair of opposite lower links and a top link, all of said links being pivotally mounted to the tractor for upward and downward movement;
    (b) lift means for moving all of the links of the three-point link assembly means upward and downward;
    (c) an axially movable power transmission shaft having universal joints at a rearward and forward end thereof, the forward end of the shaft being connected to the PTO shaft through a front universal joint and the rearward end of the shaft being removably connected to the male spline-ended portion of the input shaft through a rear universal joint, the rear universal joint having a female spline coupling which is removably coupled to the male spline-ended portion;
    (d) a connector interconnecting the lower links and the top link;
    (e) an upper engaging portion mounted at an upper position of the connector for removably coupling at an upper connecting position of the work machine;
    (f) lower engaging portions mounted at lower positions of the connector, said lower engaging portions being removably coupled at the lower connecting positions of the work machine; and
    (g) a coupling assembly provided centrally of the connector for removably connecting said rearward end of the transmission shaft to the input shaft of the work machine, the coupling assembly comprising a tubular case rotatably supporting said rear universal joint axially fixed relative to the transmission shaft, and also comprising resilient support means for buffering misalignment when the female spline coupling of said rearward end of the transmission shaft is coupled to the male spline-ended portion of the input shaft.

2. The connecting device as defined in claim 1, wherein the rear universal joint comprises a front yoke and a rear yoke, said front and rear yokes being connected by a spider, the rear yoke being rotatably supported by a bearing in the tubular case, said rear yoke bearing axially fixed relative to the tubular case, said rear yoke having the female spline coupling of the rear universal joint.

3. The connecting device as defined in claim 1, wherein the connector comprising a connector member said connector member being an inverted V-shaped pipe, a bridge member interconnecting opposite ends of the connector member, a bracket secured to the top of said inverted V-shaped pipe, and support members secured to the opposite ends of the connector member, wherein the top link of the three-point assembly means is removably connected with the bracket, and the lower links are removably connected to the support members the upper engaging portion being located on the bracket, and the lower engaging portions being located on each of the support members.

4. The connecting device as defined in claim 3 wherein the upper engaging portion is engageable at the upper connecting position of the work machine from below, and the lower engaging portions are engageable at the lower connecting positions of the work machine when the three-point link assembly means is pivotally moved upward by the lift means after the upper engaging portion is engaged with the upper connecting position to lift the work machine and thereby move the machine toward the tractor about a point of engagement between the upper engaging portion and the upper connection position.

5. The connecting device as defined in claim 4, wherein each of the support members is provided with a restraining assembly for preventing disengagement of the lower engaging portion from the lower connecting position.

6. The connecting device as defined in claim 1, wherein the coupling assembly further comprises a holder having a centrally positioned aperture, said holder being mounted on the connector, the tubular case being loosely inserted through the aperture of the holder, the resilient support means being provided between the holder and the tubular case.

7. The connecting device as defined in claim 6, wherein the holder is fixed to the connector.

8. The connecting device as defined in claim 6, wherein the holder is movably mounted on the connector by resilient members.

9. The connecting device as defined in claim 6, wherein the aperture has a centrally disposed axis and wherein the holder is movably supported on the connector by a pair of opposite pivots having a horizontal axis intersecting the axis of the aperture at generally right angles thereto.

10. The connecting device as defined in claim 6, wherein the resilient support means in a coiled spring surrounding the tubular case, the coiled spring has one end in bearing contact with an end face of the holder and the other end in bearing contact with a spring support projecting from one end of the tubular case.

11. The connecting device as defined in claim 1, wherein the tubular case is supported by the resilient support means so as to be axially movable over a distance greater than or equal to a length of a spline joint between the input shaft and said rearward end of the transmission shaft.

* * * * *